April 5, 1966 B. M. OLIVER 3,245,010
BALUNS
Filed July 23, 1962 2 Sheets-Sheet 1

INVENTOR
BERNARD M. OLIVER
BY
ATTORNEY

April 5, 1966     B. M. OLIVER     3,245,010
BALUNS
Filed July 23, 1962                           2 Sheets-Sheet 2

INVENTOR
BERNARD M. OLIVER
BY
ATTORNEY

United States Patent Office 3,245,010
Patented Apr. 5, 1966

3,245,010
BALUNS
Bernard M. Oliver, Los Altos Hills, Calif., assignor to Hewlett-Packard Company, Palo Alto, Calif.
Filed July 23, 1962, Ser. No. 211,638
5 Claims. (Cl. 333—26)

This invention relates to improved baluns (balance-to-unbalance transformers) which have a frequency response that is substantially flat over a wide band of frequencies.

Wide band baluns are frequently used in pulse inverter applications and in the balanced deflection systems of high frequency oscilloscopes. Devices of this type are described in the literature (see R. W. Rochelle, "A Transmission-Line Pulse Inverter," Review of Scientific Instruments, vol. 23, No. 6, pages 298–300; and Talkin and Cuneo, "Wide-Band Balun Transformer," Review of Scientific Instruments, vol. 28, No. 10, pages 808–815). In these applications it is desirable to provide an inexpensive balun which inverts the polarity of a wave without changing its amplitude or waveshape.

Accordingly it is an object of the present invention to provide a balun which has a frequency-response characteristic that is substantially flat over a wide band of frequencies.

In accordance with a preferred embodiment of the present invention, a pair of conductors having cross-sectional areas which vary oppositely with length are arranged to form a transmission line. The large end of one conductor is placed near the small end of the other conductor and the pair is threaded through a core of magnetic material. Thus, at each end of the pair there appear two conductors, one having large cross-sectional area, the other having small cross-sectional area. The signal to be inverted is applied across the conductors at one end of the pair and the inverted signal is obtained across the conductors at the other end of the pair. The conductor of large cross-sectional area at each end of the pair is connected to a source of reference potential, say ground.

Figure 1:
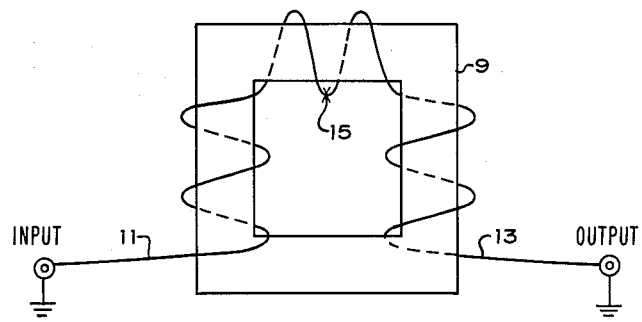
Figure 2:
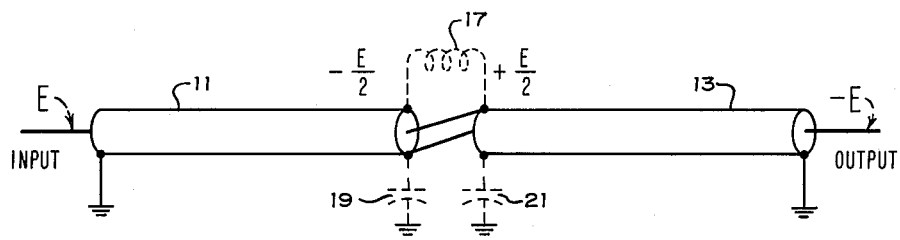
Figure 3:
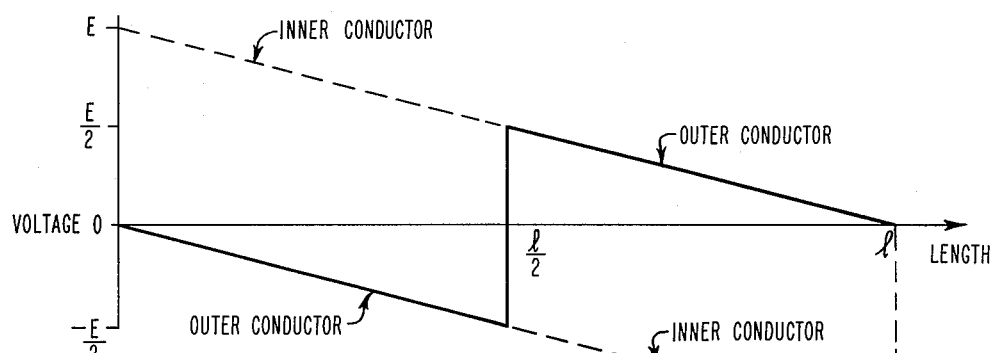
Figure 4:
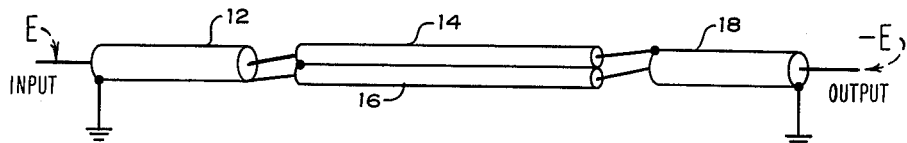
Figure 5:
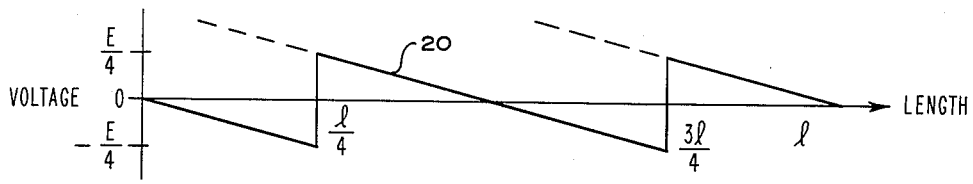
Figure 6:
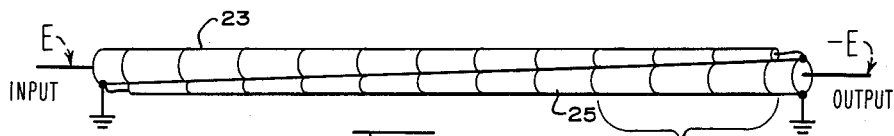
Figure 7:
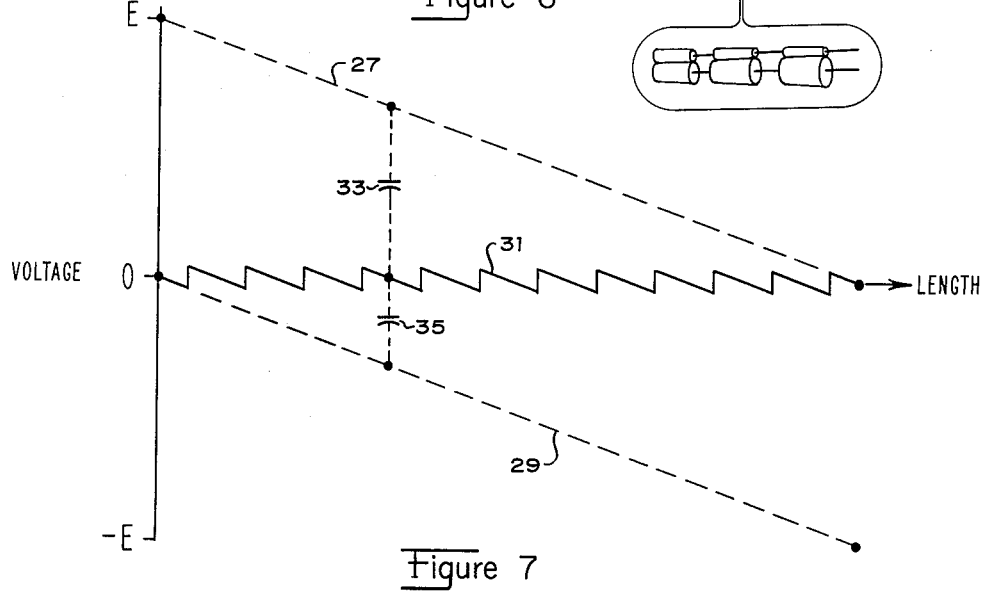

Other and incidental objects of the present invention will be apparent from a reading of this specification and an inspection of the accompanying drawings in which:

FIGURE 1 shows a conventional balun transformer;
FIGURE 2 shows the conductors of the transformer of FIGURE 1 unwound and straightened out;
FIGURE 3 is a graph showing the voltage distribution along the length of the conductors of FIGURE 2;
FIGURE 4 shows the conductors used in one embodiment of the present invention;
FIGURE 5 is a graph showing the voltage distribution along the length of conductors of FIGURE 4;
FIGURE 6 shows the conductors used in a preferred embodiment of the present invention; and
FIGURE 7 is a graph showing the voltage distribution along the length of conductors of FIGURE 6.

A conventional balun transformer as shown in FIGURE 1 uses a core of magnetic material 9 through which lengths of coaxial lines 11 and 13 are threaded. A transposition of the outer conductors and inner conductors of coaxial lines 11 and 13 is made at the midpoint of the winding 15. The coaxial lines 11 and 13 are shown unwound and straightened out in the pictorial diagram of FIGURE 2. If a step function of voltage having an amplitude E is applied at the input end of line 11 between the inner conductor and outer conductor, no transformer action occurs until this step function propagates to the center of the winding 15 where the transposition is made. At this time, a voltage $-E/2$ suddenly appears on the outer conductor at the end of coaxial line 11 near the transposition and a voltage $+E/2$ simultaneously appears on the outer conductor at the end of coaxial line 13 near the transposition. The resulting voltage distribution along the inner and outer conductors is shown by the graph of FIGURE 3. If we follow the outer conductor from the end of outer conductor 11 near the transposition to ground at the input end of coaxial line 11, across to ground at the output end of coaxial line 13, and along the outer conductor of line 13 to the end of outer conductor 13 near the transposition we find that the conductors have threaded the core of the transformer of FIGURE 1 a number of times equal to the number of turns on the winding. As a result, the inductance of the transformer winding 17 connects points A and B and thus is in shunt across the line at the midpoint of the winding.

This sudden appearance of the voltage $-E/2$ at the end of the outer conductor of line 11 and of the voltage $+E/2$ at the end of the outer conductor of line 13 requires that stray capacitances of the outer conductors to the core, to surrounding space, and turn-to-turn, be charged. These capacitances are lumped together and are shown as capacitor 19 on the outer conductor of line 11 and as capacitor 21 on the outer conductor of line 13. There is thus an equivalent shunting capacity which also appears across the line at the midpoint of the winding. The equivalent circuit of the conventional balun of FIGURE 1 includes a parallel resonant circuit shunting a transmission line substantially at its midpoint. The low frequency cutoff of the balun is determined substantially by the value of the equivalent inductor. The high frequency cutoff is determined substantially by the value of the equivalent capacitor. The bandwidth of the device is thus increased by increasing the size of the inductance and by decreasing the effective capacity shunting the transmission line.

In accordance with one embodiment of this invention, one effective method of extending the bandwidth is to perform the transposition of conductors in two steps, as shown in FIGURE 4. The inner and outer conductors of each of coaxial lines 12 and 18 are transposed using two interconnection points, one being at a point one quarter of the total conductor length and the other being at a point three quarters of the total conductor length. The first interconnection at the one-quarter point is between the inner and outer conductors of coaxial line 12 and the inner conductors of each of coaxial lines 14 and 16. The impedance of each of coaxial lines 14 and 16 is equal to one-half of the impedance of the coaxial line 12. The outer conductors of the coaxial lines 14 and 16 are connected together. The other interconnection at the three-quarter point is between the inner conductors of coaxial lines 14 and 16 and the conductors of coaxial line 18. It can be seen that the final result is a transposition of the conductors of coaxial lines 12 and 18. The voltage distribution along the outer conductors in this configuration for a step function of voltage of amplitude E and applied at the input is shown in FIGURE 5 as saw-tooth line 20. As a result of this potential distribution, an equivalent capacitor appears in shunt with the line at each interconnection point. The voltages on opposite sides of each of the interconnection points is much smaller and each such equivalent capacitor is much smaller than the equivalent capacitor obtained using the one-step transposition as shown in FIGURE 2. This results in improved high frequency performance of the balun. Satisfactory results are also attainable using a pair of conductors without outer shields and having equal cross-sectional area in place of coaxial lines 14 and 16 of FIGURE 4.

A further improvement in the high frequency performance of the balun is obtained, according to another embodiment of the present invention, by threading a pair of conductors substantially as shown in FIGURE 6 through a core of magnetic material as shown in FIGURE 1. Each of the conductors is a length of tapered coaxial line. The outer conductors of both coaxial lines are broken at frequent intervals to form a plurality of transition sections similar to those shown in FIGURE 4. The outer conductors in each section are in electrical contact but the outer conductors in one section are electrically insulated from the outer conductors in adjacent sections. The graph of FIGURE 7 shows the voltage distribution along the conductors for a step function of voltage having an amplitude E which is applied to the input end. The upper slanting line 27 represents the voltage distribution along the inner conductor of line 23 for a step function of voltage applied at the input end. The lower slanting line 29 represents the voltage distribution along the inner conductor of line 25. The saw-tooth line 31 represents the voltage distribution along the outer conductors. It can be seen that if the impedance of the coaxial lines taper substantially linearly and oppositely with length, the capacities 33 and 35 attributable to each of the sections are such that there is no net current flow to the outer conductors. In the limit, the entire transformer can be wound using a special coaxial line in which the outer conductor at the input end splits, opens, and shrinks to a wire which becomes the inner conductor at the output end, while the inner conductor at the input end emerges and spreads around the other conductor to become the outer conductor at the output end. A more practical extension of this invention uses a pair of tapering or wedge-shaped conductors disposed on opposite faces of a flexible insulator with the tapers oppositely aligned. This special conductor is then threaded through a core of magnetic material substantially as shown in FIGURE 1.

The improved balun of the present invention thus provides signal inversion without distortion of waveform or decease of signal amplitude over a wide band of frequencies.

I claim:

1. Signal conductors for a balun, said conductors comprising first and second pairs of conductors, each pair forming a transmission line having a characteristic impedance, one conductor in each pair having larger cross-sectional area than the other conductor, at least two pairs of coaxial conductors, each pair having inner and outer conductors, a first conduction path including the inner of one of said two pairs of coaxial conductors connecting the conductor in the first pair having the largest cross-sectional area to the conductor in the second pair having the smallest cross-sectional area, a second conduction path including the inner conductor of the other of said two pairs of coaxial conductors connecting the remaining conductors of the first and second pairs, the characteristic impedance of each of the two pairs of coaxial conductors being less than the characteristic impedance of one of the first and second pairs of conductors connected thereto.

2. Signal conductors for a balun, said conductors comprising first and second pairs of coaxial conductors, the conductors in each pair forming inner and outer conductors, at least another pair of conductors, a first conduction path including one conductor of said other pair connecting the outer conductor in the first pair to the inner conductor in the second pair, and a second conduction path including the other conductor of said other pair connecting the remaining conductors of the first and second pairs, the length of the conductors in said other pair being substantially twice the length of the conductors in one of the first and second pairs, the conductors in each of the first and second conduction paths being arranged to form a transmission line.

3. Signal conductors as in claim 1 wherein the conductor in each of said first and second pairs having the largest cross-sectional area is connected to a source of reference potential.

4. Signal conductors as in claim 2 wherein the outer conductors in said first and second pairs are connected to a source of reference potential.

5. Signal conductors for a balun, said conductors including a plurality of pairs of coaxial lines having impedances which vary linearly and oppositely with length, each of said pairs forming a transition section and each of said coaxial lines in a section having an inner conductor and an outer conductor, means connecting together the outer conductors of the coaxial lines in each section, the outer conductors in one section being insulated from the outer conductors in adjacent sections, means connecting the inner conductor of each of the lines in one section to the inner conductor of a corresponding line in an adjacent section, and means to apply signal between the inner conductors of said coaxial lines in one of said sections.

References Cited by the Examiner

UNITED STATES PATENTS 2,925,566    2/1960    Jasik _____ 333—26

HERMAN KARL SAALBACH, Primary Examiner.

G. TABAK, Assistant Examiner.